March 17, 1970  R. J. JOHNSTON  3,501,230
THREE-DIMENSIONAL DISPLAY SYSTEM
Filed Nov. 7, 1966  3 Sheets-Sheet 1

ROBERT J. JOHNSTON
INVENTOR.

BY R.E. Geangue
ATTORNEY

ROBERT J. JOHNSTON
INVENTOR.

BY R. E. Geangue
ATTORNEY

ROBERT J. JOHNSTON
INVENTOR.

BY R. E. Geauque

ATTORNEY

United States Patent Office 3,501,230
Patented Mar. 17, 1970

3,501,230
THREE-DIMENSIONAL DISPLAY SYSTEM
Robert J. Johnston, 408 Grove Lane,
Santa Barbara, Calif. 93105
Filed Nov. 7, 1966, Ser. No. 592,367
Int. Cl. G03b 35/24
U.S. Cl. 353—10
9 Claims

ABSTRACT OF THE DISCLOSURE

A three-dimensional viewing system has a viewing surface which diffuses incident light rays in a vertical direction only. A plurality of images are projected from image sources onto the viewing surface simultaneously such that the images are superimposed. Each image is a view of the same photographed scene but represents the view as seen from a different vertical plane through the scene. Each image source is displaced from the viewing surface by a different distance, the source farthest away from the viewing surface representing the view of the scene from the greatest distance such that as a viewer moves from side to side of the viewing surface the elements shown by the different image sources will appear to move with respect to each other.

---

Figure 1:
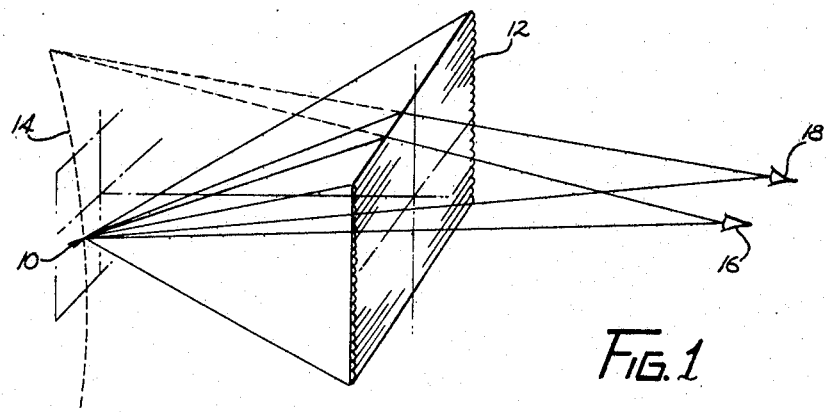

This invention relates to a three-dimensional display system, and, more particularly, to such a system that involves a semi-volumetric concept rather than one requiring the use by an observer of special viewing devices to separate two images to give the three-dimensional effect.

Heretofore, three-dimensional effects have usually been obtained through the use of the well known stereoscope or means that required different filters in front of an observer's two eyes to separate two images being simultaneously viewed. In the case of the stereoscope, two pictures were taken from locations slightly displaced from each other in a horizontal plane and, when developed and printed, one eye viewed one print and the other eye viewed the other print. Thus, because of binocular vision, a sense of depth perception was imparted to the viewer.

Thus far, there has not been developed any generally used three-dimensional display system that does not require the use of one image for an observer's left eye and another image for the observer's right eye in order to take advantage of the observer's binocular vision to produce a three-dimensional effect. This has required the use of relatively cumbersome optical instruments (such as the stereoscope) or of inconvenient glasses (such as those having mutually perpendicularly polarized material therein) to view two pictures simultaneously projected on a reflective viewing screen, as in a moving picture house.

The present invention obviates the foregoing disadvantages by providing a true three-dimensional display system from a two-dimensional image in which no instruments, glasses, etc., need be used by an observer to observe three-dimensional images from any normal viewing position in front of a screen. As the observer moves to the right or left in front of the screen, points in the three-dimensional image appear to be stationary in space. Those points which are not in the plane of the viewing screen appear to move horizontally with respect to the frame of the screen, as they would in real life. If the image sources do not lie in a single plane parallel to the screen, they appear to move in front of one another as the observer moves horizontally, again as in real life.

The two-dimensional information can be provided by a photograph, from projection screens, a drawing, or in other ways such as from radar or a television link. The information may be in the form of a transparency, opaque reflective medium, projection screen, cathode ray tube face, or virtually any other substantially plane surface that bears an image. The image may be either in black and white or in color.

It is assumed hereinafter that an observer is looking substantially horizontally at a viewing screen with his eyes in an approximately horizontal line. The terms vertical and horizontal will be used hereinafter to describe a display so oriented.

In the normal, or usual, projection of slides or motion pictures, a picture is projected that is enlarged in both horizontal and vertical directions. Each point of the projected image is diffused at a viewing screen, and binocular vision causes the image to appear to be planar in the plane of the screen.

In the present invention, an image source is imaged using an imaging means which focuses only in a vertical direction onto a screen which diffuses only in a vertical direction. The light rays continue unfocused from the source in a horizontal sense and binocular depth perception causes the image to appear at the point of diffusion of each point of the image source being imaged.

The fact that parallax is only required in a horizontal sense in normal viewing of a display, because of the horizontal placement of the eyes, and none is required in a vertical sense, is utilized to use vertical space in the picture elements to store vertically compressed information which can be expanded vertically, as will be explained, while producing parallax in the horizontal sense.

Assuming that a source of light is a point source imaged only in a vertical direction onto a screen, which diffuses only in a vertical direction, an observer, with his two eyes in an approximately horizontal line, will see the point source appearing to lie in a plane through his two eyes and the horizontal line intercept on the viewing surface. The apparent distance behind the surface will be determined by the actual path length of the rays from the point to the surface. Two or more points will appear one in front of the other if the rays from each point intercept a common line on the diffusing viewing surface and if their actual path lengths are different. Thus, a three-dimensional effect can be imparted to a projection of a flat, two-dimensional image if various portions of the image are spaced at different distances from a viewing screen.

Figure 2:
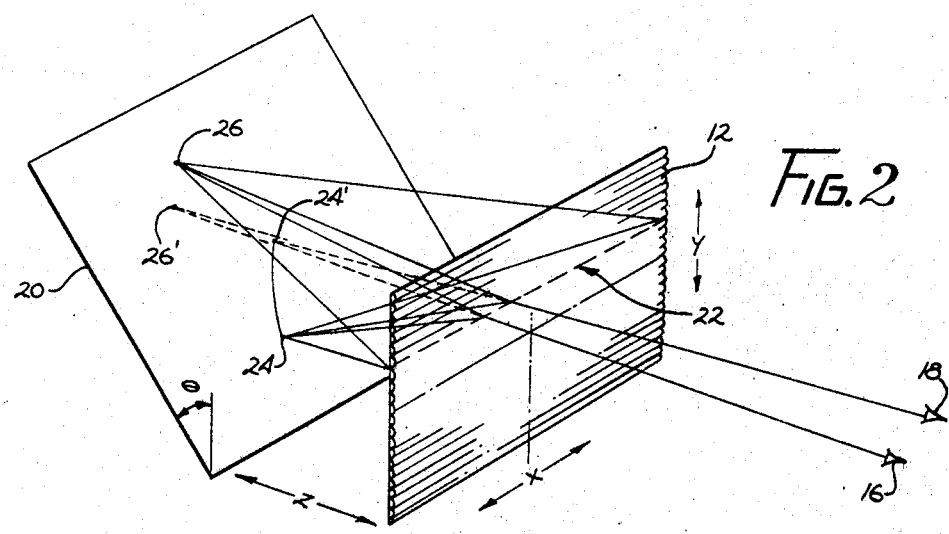
Figure 3:
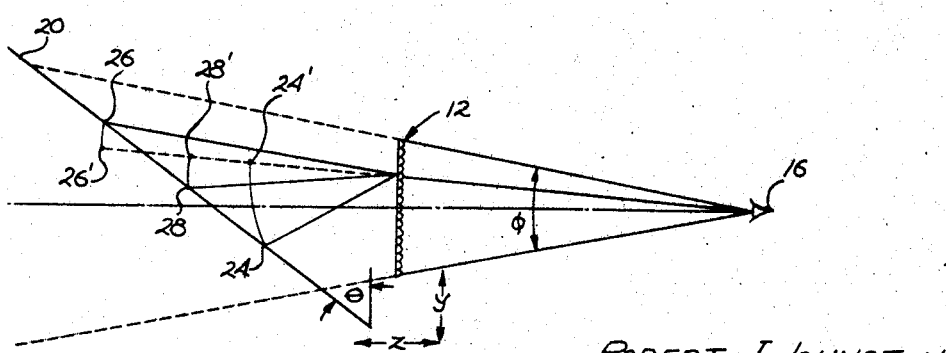
Figure 4:
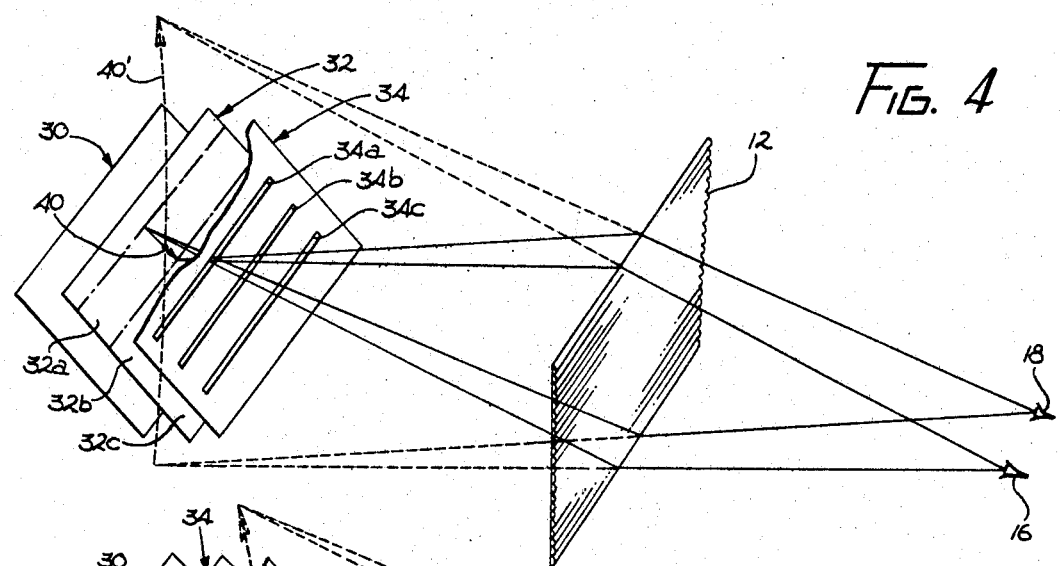
Figure 5:
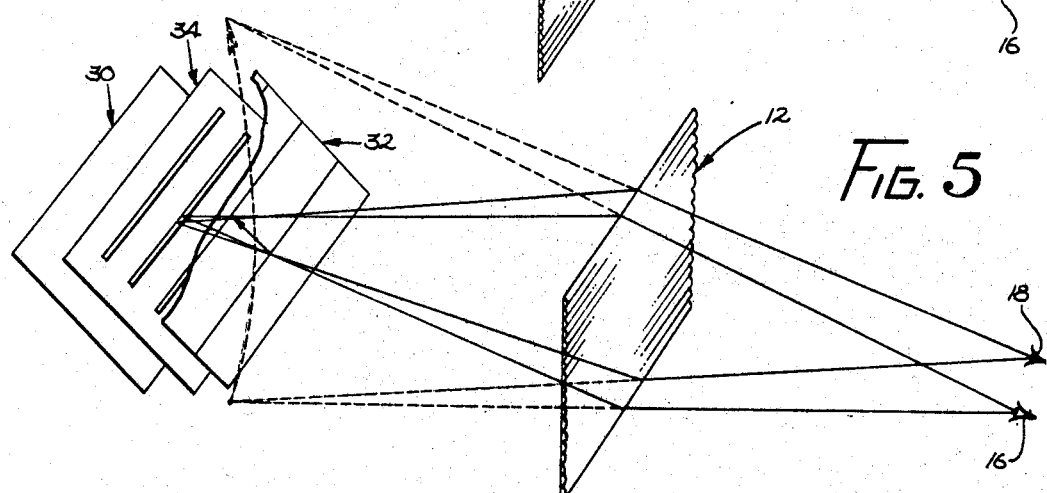
Figure 6:
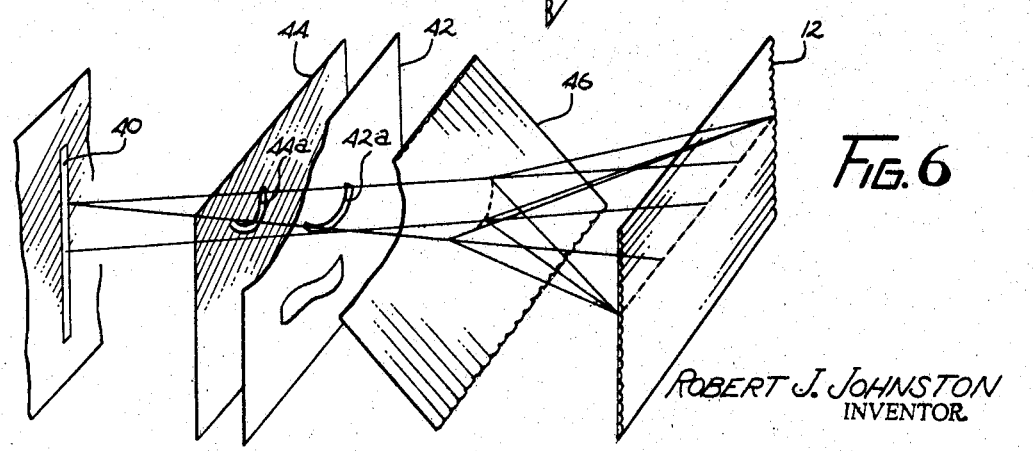
Figure 7:
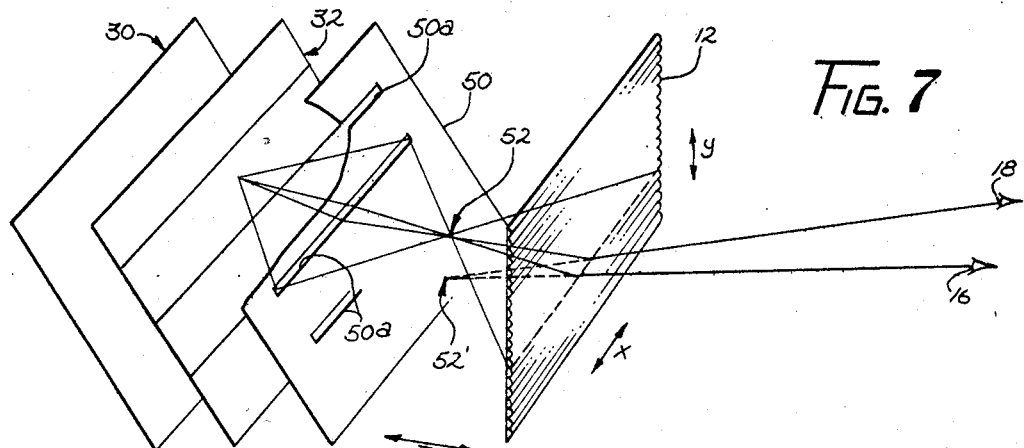
Figure 8:
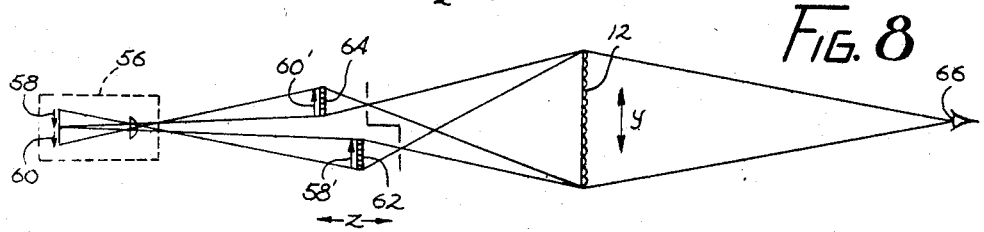
Figure 9:
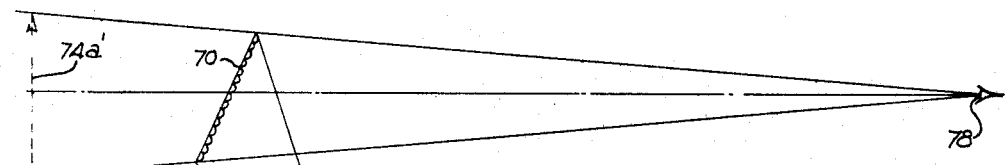
Figure 10:
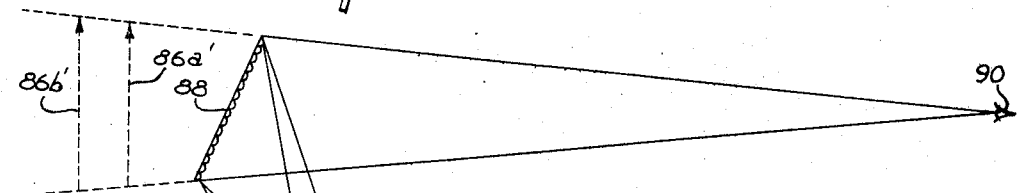

The invention, together with further features and advantages thereof, will be better understood from the following description, taken in conjunction with the accompanying drawings, in which:

FIGURES 1, 2 and 3 are diagrams illustrating the basic concept of the invention;
FIGURE 4 is a diagram of one embodiment of the invention;
FIGURE 5 is a diagram of another embodiment of the invention that is generally similar to the embodiment showing in FIGURE 4;
FIGURE 6 is a diagram of a third embodiment of the invention;
FIGURE 7 is a diagram of a fourth embodiment of the invention; and
FIGURES 8 through 10 are diagrams of still other embodiments of the invention.

FIGURE 1 illustrates the basic principle upon which the present invention is based. As is well known in the optical art, rays of light emanating from a point source of light 10 are incident at all points of a viewing surface 12, in the absence of any control means, such as a lens or slit, interposed between the source and the viewing surface. If the viewing surface diffuses only in the vertical direction (as seen in FIGURE 1), the point source 10 will appear as a vertical line 14 extending upwardly and downwardly through the point source 10, to an observer whose two eyes 16 and 18 are located in a substantially horizontal plane. Due to the binocular perception of a normal observer, the line 14 will appear to be curved (as shown), due to the difference in path lengths between the point source 10 and the different parts of the viewing surface 12. That is, there is a difference in the optical path lengths between rays emanating from the point source 10 and incident on the upper portion of the viewing surface 12 and those incident on the center portion of the viewing surface.

The viewing surface 12 may be any one of a number of types of surfaces, and may be vertical, slanted, or curved. For example, it may be a transparent surface having a plurality of horizontally-oriented cylindrical lenses that have no power in the horizontal plane, but that diffuse in the vertical plane. Alternatively, the viewing surface may be reflective, with cylindrical lenses formed thereon. The principal requirement is that the viewing surface be diffusing in the vertical direction and non-diffusing in the horizontal direction. This takes advantage of the fact that parallax is required only in a horizontal direction, because of the horizontal placement of the eyes, and none is required in a vertical direction to perceive depth.

FIGURE 2 illustrates the concept of the invention in somewhat more detail than FIGURE 1. FIGURE 2 shows a plane surface 20 that is slanted about a horizontal axis to form an angle with the plane of the vertically-diffusing viewing surface 12, which is vertically oriented. If various points lying on the surface 20 are illuminated singly, and the rays of light from each of those points is constrained to a plane that intercepts the viewing surface 12 in the same horizontal line 22, an observer with his eyes in an approximately horizontal plane will see points separated in the Y direction also separated in the Z (or depth) direction. For example, an apparent image of a point 24 lying near the edge of the plane closest to the surface 12 will appear at a point 24' closer to the viewing surface 12 than will the apparent image 26' of a point 26 lying farther from the surface 12. This occurs because the path length from the point 24 is shorter than that from the point 26, and so the point 24 appears to a viewer with binocular vision to be in front of the point 26. Of course, as the angle varies, the apparent distance between the various points on the plane 20 varies.

To clarify the explanation, assume that an observer's eyes are located on a plane perpendicular to the plane of the diffusing viewing surface 12 and parallel to the axis of diffusion of the vertically-diffusion elements of the viewing screen 12. The apparent position of the point 24 in the Y direction will depend on the position in the Y direction of the interception of the light rays emanating from the point and incident on the diffusing surface. The apparent position of the point 24 in the X direction depends on its actual position in the X direction. The apparent position of the point 24 in the Z direction depends on the actual path length of the rays from the point to the viewing surface. The point 24 appears to move horizontally relative to the viewing surface as the observer moves his eyes in a horizontal plane. When, as shown in FIGURE 2, the points 24 and 26 do not lie in a single plane parallel to the viewing surface 12, the points will appear to move in front of each other as the observer moves horizontally, as in real life.

FIGURE 3 is a side view of the arrangement shown in FIGURE 2 showing points 24, 26 and 28 located at different vertical positions on the surface 20. The apparent positions of these points are at 24', 26' and 28', respectively, which appear to be spaced apart from each other in the Z direction to an observer looking at the viewing surface 12. Thus, all points lying on the surface 20 and vertically spaced from each other will appear to an observer to be lying one in front of another, assuming that the points lie within the vertical dimension subtended by the angle θ, which is determined by the height of the viewing surface 12 and the distance of the observer's eyes from the surface 12.

From the foregoing description, it is seen that four elements are required in the system of the invention. Those elements are as follows:

(a) Means for illuminating the points of a two-dimensional image source to be converted into three dimensions.

(b) A two-dimensional image source.

(c) Means for imaging the source in a vertical direction only.

(d) A vertically-diffusing viewing surface on which the source is imaged without changing the vertical planes in which rays lie.

An embodiment of the invention utilizing one arrangement of the four elements heretofore set forth is shown in FIGURE 4. The vertically-diffusing viewing surface 12 may be the same as that previously described with reference to FIGURES 1 through 3. The observer, having eyes 16 and 18 located in a plane approximately horizontal and parallel to the axes of the diffusing elements of the surface 12, will see no magnification in a horizontal direction, but will see rays emanating from a source and imaged thereon as diffused in a vertical direction.

In the embodiment shown in FIGURE 4, illumination is provided by a diffuse light source 30, such as a ground glass, that uniformly illuminates all points of an image source, in this case a transparency 32. Placed in front of the transparency 32 is control means, in this case a plurality of horizontal slits 34a–34c in a control element 34. Each of the slits 34a–34c images a particular vertical segment of the image source 32 entirely over the viewing surface 12. It is pointed out that the image source 32 is divided into a plurality of sections 32a–32c.

Each of the sections 32a–32c contains information compressed in a vertical sense appearing in a different vertical plane through the image and displaced from one another in the Z direction, that is, in depth. The section farthest from the viewing surface 12 contains the information about the image farthest away from an observer and so on progressively until the section closest (in optical path length) to the surface 12 contains the information about the image source in the chosen plane closest to the observer. It is pointed out that there are discontinuities, and depth perception will occur in incremental steps, depending on the widths of the sections 32a–32c and the positions in the Z direction of the planes whose information they contain. From what has been said before, it is apparent that each section 32a–32c will appear to be at a different distance from a viewer looking at the screen 12. Thus, each section, combined with the others, contributes information relating to one particular plane to the over-all image to create an illusion of a true three-dimensional image. It is noted that the image displayed on the viewing surface 12 will be inverted, and this should be taken into account in making the transparency 32. For example, an arrow 40 placed point down in the section 32a of image source surface 32 will appear to an observer looking at the viewing surface 12 as an arrow 40' placed point up and at a particular distance from the viewing surface. Were an arrow placed in the image source section 32c, which is closer to the viewing surface than the section 32a, the image of the arrow would appear to be in front of the arrow in the section 32a.

A second embodiment of the invention, which is quite similar to that embodiment shown in FIGURE 4, is shown in FIGURE 5. It differs from that shown in FIGURE 4 only in that the image source 32 and the control means 34 are interchanged. All elements are the same as those described with reference to FIGURE 4. The embodiment shown in FIGURE 5 does have one advantage over that shown in FIGURE 4, however, in that the image appears to the observer with the same orientation that it has on the source 32; that is, an arrow pointed upwardly on the source 32 will appear to an observer to be pointed upwardly. Thus, the possible difficulty of inverting the images on the source 32 is eliminated.

FIGURE 6 illustrates a third embodiment of the invention. In that embodiment, a vertical line source of light 40 is utilized behind an image source 42. Interposed between the line source 40 and the image source 42 is an imaging element 44 having slits 44a therein specially placed to image certain desired portions (such as the portion 42a) of the image source 42 onto an element 46. The element 46 diffuses rays incident thereon only in a horizontal direction. Thus, it may comprise a plurality of cylindrical lenses having their axes of curvature lying in a plane slanted backwardly with respect to the vertical plane of the viewing surface 12. Slanting the element 46 takes the place of slanting the image source, as was the case of the embodiments shown in FIGURES 4 and 5.

FIGURE 7 illustrates a fourth embodiment of the invention, which is basically similar to that shown in FIGURE 4. Illumination is provided by the diffuse light source 30 to the transparent image source 32. However, the control means differ from that shown in FIGURE 4. As shown in FIGURE 7, the control means 50 comprises a plurality of horizontally arranged cylindrical lenses 50a having their cylindrical axes lying in a plane parallel to that of the slanted image surface 32. Each point on the image source surface 32 is imaged in space, as shown for one point at 52, to provide a real image that is diffused in a horizontal direction but not in a vertical direction. Vertical diffusion is provided by the viewing surface 12, as in the embodiments previously described. Thus, an apparent image appears at a point 52′ that lies at the distance of the point 52 behind the viewing surface 12. That distance depends on the vertical position of the point on the image surface 32. An observer, whose eyes are at 16 and 18, sees an image that is vertically expanded and at the location in the Z direction of the real image.

FIGURE 8 illustrates an embodiment of the invention that is essentially the same as the embodiment shown in FIGURE 4, except that the image surface elements are composed of rear projection screens arranged in steps in the Z direction. As shown, a projector 56 projects images of two arrows 58 and 60 (shown only for illustrative purposes) on two rear-projection screens 62 and 64, respectively, where they are imaged upside down, as shown by images 58′ and 60′, respectively. The projector 56 may be either a still or motion picture projector, so long as each of the screens 62 and 64 contains information representing only one plane in the Z direction through a desired subject. Alternatively, a plurality of projectors may be used, each one projecting a different image on one of the screens, each having an image representative of the information contained in one vertical plane through a subject.

While only two screens 62 and 64 are shown for illustrative purposes, it is apparent that any desired number of screens may be used, spaced apart from each other in the Z direction. Of course, each must have an image projected thereon that contains information from only one vertical plane through a subject to be imaged on the viewing surface 12.

It is pointed out that the rear projection screens shown in FIGURE 8 may be replaced by reflective image source surfaces, suitably illuminated, of course.

FIGURE 9 is a diagram of another embodiment of the invention, which is essentially similar to the embodiment shown in FIGURE 5. It differs primarily in that the vertically diffusing transparent viewing surface shown in FIGURE 5 is replaced by a vertically diffusing reflective viewing surface 70. A diffuse light source 72 illuminates an image source 74 through a plurality of slits 76a in opaque control element 76. Of course, the image source 74 is divided vertically into a plurality of sections, as in the embodiments previously described, and each section is imaged on the reflective surface 70. Again, each section of the image surface contains compressed (in a vertical sense) information representing an image in a particular vertical plane through a subject. To an observer located at 78, a section 74a of the image source 74 forms an image at a point 74a′ behind the surface 70. Images from different sections of the image source 74 will be imaged at different apparent distances behind the surface 70.

FIGURE 10 shows still another embodiment of the system of the invention. In that embodiment, the image source and the imaging elements are optically cascaded on one plane surface. A horizontally disposed line light source 80 illuminates a plurality of slits 82a in an opaque control element 82, which are imaged on a vertically diffusing surface 84. The diffusing surface 84, in turn, provides the imaging elements that image various sections 86a and 86b of an image source 86 on a reflective, vertically-diffusing viewing screen 88. The image source 86 and the control element 82 are co-planar, as shown.

To an observer located at 90, apparent images of the image source sections 86a and 86b appear at points 86a′ and 86b′ located at different distances behind the viewing surface 88. Of couse, as in other embodiments, information is compressed in a vertical sense in each of the sections of the image source 86.

It is now apparent that the present invention provides a three-dimensional display system utilizing an imaging means that focuses in only a vertical direction onto a viewing surface that diffuses in only a vertical direction. Horizontal rays from an image source are unfocused in the horizontal direction, and binocular vision by two eyes located in substantially a horizontal plane causes an image to appear at the point of diffusion of each element of an image source being used.

An image source is utilized which comprises a plurality of vertically-arranged sections, each bearing a vertically-compressed image containing information representing a particular vertical plane through a subject. A viewer will see the images of the various sections of the image source, which are projected on a viewing surface and superimposed one on the other, as apparent images one behind the other because of the difference in optical path lengths between the various sections of the image source, which is slanted with respect to the viewing surface.

It is apparent that many modifications and variations may be made in the embodiments of the invention shown and described without departing from the spirit and scope of the invention.

What is claimed is:

1. A three-dimensional display system comprising:
   an image comprising a plurality of image sources disposed in at least one of a plurality of substantially parallel planes, each containing information representative of a subject in a particular vertical plane through said subject:
   at least one source of illumination for said image sources:
   viewing surface which diffuses incident light rays in a vertical direction and is non-diffusing in a horizontal direction; and
   control means for imaging onto said viewing surface each of said image sources substantially in its entirtely in a horizontal direction, and only a segment thereof in a vertical direction, and all of the vertically imaged segments of said image sources being superimposed one on the other on said viewing surface.

2. The system defined by claim 1, wherein said image sources are located at different optical path lengths from said viewing surface to give an illusion of depth to one observing said viewing surface with his eyes located in a horizontal plane.

3. The system defined by claim 2, wherein said image sources are transparent.

4. The system defined by claim 2, wherein said image sources are reflective.

5. The system defined by claim 2, wherein said image sources are located in a plane slanted in a vertical direction with respect to said viewing surface.

6. The system defined by claim 2, wherein said image sources are located in substantially parallel, vertically oriented planes substantially parallel to and located at different distances from said viewing surface.

7. A three-dimensional system comprising:
   an image source comprising a pluarality of image sources disposed in at least one of a plurality of substantially parallel planes, each containing information representative of a subject in a particular vertical plane through said subject;
   at least one source of illumination for said image sources;
   a vertically-diffusing viewing surface; and imaging means comprising horizontally disposed slits for maging each of said image sources on said viewing surface, images of all said sources being superimposed on said vertically-diffusing viewing surface.

8. A three-dimensional system comprising:
   an image source comprising a plurality of image sources disposed in at least one of a plurality of substantially parallel planes, each containing information representative of a subject in a particular vertical plane through said subject;
   at least one source of illumination for said image sources;
   a vertically-diffusing viewing surface; imaging means comprising a plurality of cylindrical lenses having horizontal axes or curvature for imaging each of said image sources on said viewing surface, images of all said sources being superimposed on said vertical-diffusing viewing surface; and
   said image sources being located at different optical path lengths from said viewing surface to give an illusion of depth to one observing said viewing surface.

9. A three-dimensional system comprising:
   a reflective image source comprising a plurality of image sources disposed in at least one of a plurality of substantially parallel planes, each containing information representative of a subject in a particular vertical plane through said subject;
   at least one source of illumination for said image sources;
   a vertically-diffusing viewing surface; and imaging means coplaner with said image sources for imaging each of said image sources on said viewing surface, images of all said sources being superimposed on said vertically-diffusing viewing surface.

References Cited

UNITED STATES PATENTS

| | | | |
|---|---|---|---|
| 1,422,149 | 7/1922 | Troeger | 352—86 X |
| 2,075,853 | 4/1937 | Kanolt | 352—61 X |
| 2,854,883 | 10/1958 | Jones | 352—59 X |
| 2,952,182 | 9/1960 | Marks | 352—86 |
| 3,006,241 | 10/1961 | Marks | 352—86 |
| 3,182,547 | 5/1965 | Armstrong | 352—86 X |
| 3,201,797 | 8/1965 | Roth | 352—86 |
| 3,339,454 | 9/1967 | Weiner. | |

NORTON ANSHER, Primary Examiner

MONROE H. HAYES, Assistant Examiner

U.S. Cl. X.R.

350—117; 352—43, 61, 86; 353—30